United States Patent Office 3,359,807
Patented Dec. 26, 1967

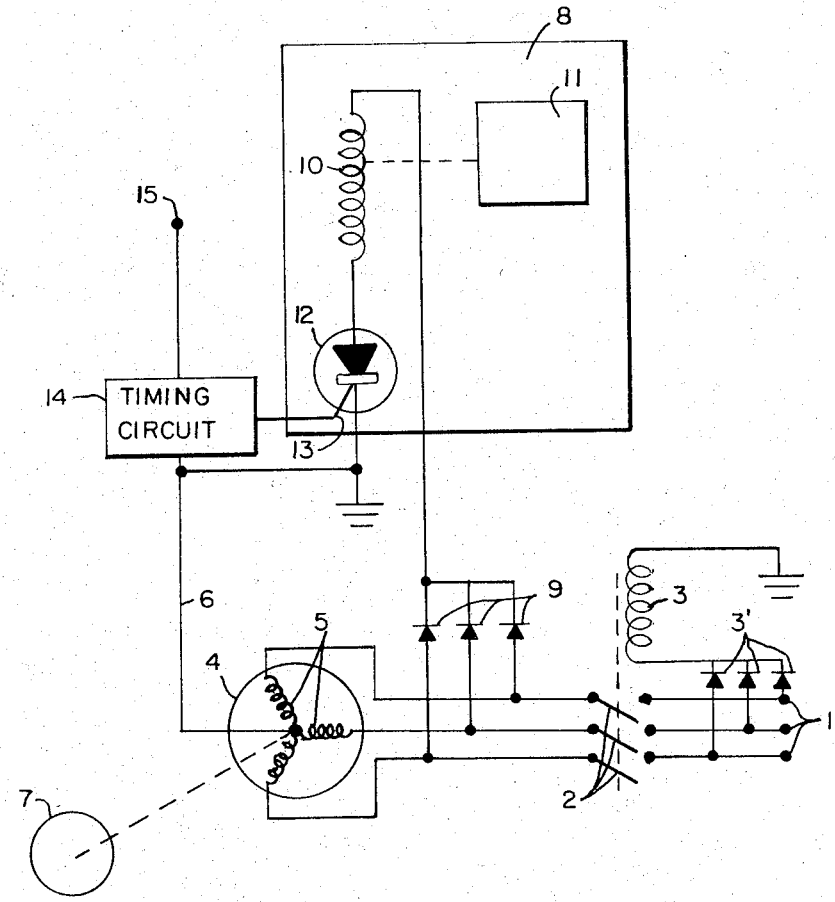

3,359,807
GYRO ERECTION SYSTEM
Arthur E. Foulds, Lynnfield, and Gerald L. Sullivan, Georgetown, Mass., assignors to General Electric Company, a corporation of New York
Filed May 17, 1965, Ser. No. 456,301
8 Claims. (Cl. 74—5.41)

Our invention relates to gyro control circuits and, more specifically, to circuits which control the erection cycle of a gyro.

Our invention is particularly useful in gyro systems in which the direction of a gyro spin axis or the orientation of a gyroscopically stabilized platform is corrected during normal operation of the system to correspond to a reference direction determined by a gravitational device of other means. When the position of the gyro is corrected, it is said that the gyro is erected. Gyro systems of this type include platforms and vertical gyros which are gyroscopically stabilized in a plane having a predetermined relationship to the reference direction. A number of sensors are attached to the gyro gimbals to generate signals corresponding to the deviation of the platform or the gyro spin axis from the reference direction. The signals from the sensors are coupled to torque motors or torquers responsive thereto which are connected to the gimbals to erect the gyro with respect to the reference direction.

During the normal operation of the gyro, the rotating mass or rotor of the gyro is spinning rapidly under the influence of a motor so as to have a high angular momentum. Under these circumstances the gyro tends to react to a disturbing torque by precessing, i.e., rotating about the axis at right angles to the axis of the applied torque. Thus, when a sensor senses that a gimbal has deviated from the plane defined by the reference direction, it transmits its signals to a torquer which corrects for the deviation by appling a torque about a gimbal axis which is at right angles to the axis of deviation. This is called precession erection of the gyro.

During the initial start-up period of the gyro, there is a short interval of time during which either the gyro rotor is not in motion or it is spinning slowly so that its angular momentum is small. Thus, a disturbing torque applied to one of the axes of the gyro does not cause a precession of the gyro but rather results in a motion about the axis of the torque. Therefore, during the initial start-up period, or at any time when the angular momentum of the gyro is very small, an erection torque must be applied about the axis of the deviation. This operation is called direct erection of the gyro.

For a predetermined length of time after the initial application of power to the gyro system, it may also be desirable to apply a high excitation voltage to the torquers to obtain high torquing rates. Also, it may be desirable to effect the erection cycle of the gyro in some other manner when the magnitude of angular momentum of the gyro rotor is below a predetermined minimum value.

For example, when the power applied to the gyro system is interrupted, the gyro rotor begins to slow down, and consequently it has a lower angular momentum. If the angular momentum decreases sufficiently before the power is reapplied to the gyro system, it may be desirable to change the erection cycle of the gyro system in some manner described above, such as by changing to a direct erection mode. For this reason gyro systems include circuits for changing the erection cycle of the gyro after an interruption in the power supplied to the gyro system. However, in many applications of gyros it is not advantageous to change the erection cycle of the gyro after each power interruption. For example, in aircraft applications there may be a failure in the main power supply which provides power for the gyro system. In most cases an emergency power supply provides the needed power within 15 seconds of the failure. The outside safe time limit for providing this power is around 30 seconds. During this short power interruption, the angular momentum of the gyro rotor does not decrease sufficiently to warrant a change in the erection cycle. Therefore, each of these erection cycle changing circuits incorporates some means for inhibiting the change in the event that a power interruption occurs for a short time only.

Some prior art erection cycle changing circuits have inhibited this change of erection cycle by means of time delay relays which prevent a change in the erection cycle for power interruptions of less than a predetermined duration. However, the limitations in the characteristics of available thermal relays or electronic timing circuits may provide less than optimum performance. For example, their maximum dependable time delay may be relatively short compared with the minimum desirable time for a change in erection cycle, and their performance may be adversely affected by ambient temperature conditions. Furthermore, the operation of these circuits is independent of the angular momentum of the rotor, the characteristic of the gyro which actually determines when the erection cycle should be changed. In some instances, a malfunction of these circuits could cause a failure of the gyro system such as "gimbal tumbling."

It is an object of our invention to provide an improved erection cycle changing circuit which inhibits a change in the erection cycle of a gyro after a short interruption in the gyro system power supply without the use of a time delay circuit.

It is another object of our invention to provide an erection cycle changing means which operates in response to a parameter which is dependent upon the angular momentum of the gyro rotor.

It is a further object of our invention to provide an erection cycle changing circuit which prevents undesirable changes in the erection cycle of a gyro system.

Briefly stated, and in accordance with one aspect of our invention, we provide an improvement in a gyro system having erection cycles capable of a number of modifications as described above. The gyro system itself includes a means for changing the erection cycle of the gyro between a first and a second type of erection mode after an interruption in the power supplied to the gyro system. It further includes an electric motor for rotating the gyro rotor. In our improvement, the cycle changing means comprises a control means having a first energization state for effecting the first type of erection mode of the gyro and a second energization state for effecting the second type of erection mode of the gyro. It further comprises an energy level responsive means. The gyro system also includes a means for coupling energy generated by the motor after the power interruption to the erection cycle changing means. It further includes means for connecting the energy level responsive means to the control means so that the control means is in the second energization state upon reapplication of the power as long as the generated energy remains above a predetermined energy level.

With respect to the gyro system itself, it has been found that when the power supplied to the gyro system is interrupted and the motor no longer drives the gyro rotor, the momentum of the gyro rotor rotates the motor armature due to a coupling therebetween. Thus, the motor acts like an electrical generator having a generated energy level which is indicative of the angular momentum of the gyro rotor. By providing a cycle changing means which is responsive to this generated energy level, we also provide a means which is dependent upon the angular momentum of the gyro rotor.

While the specification concludes with claims particularly pointing out and distinctly claiming the subject matter which we regard as our invention, it is believed our invention will be better understood from the following description taken in connection with the accompanying drawing in which:

FIGURE 1 is a schematic diagram showing one embodiment of our invention.

FIGURE 1 shows one preferred embodiment of our invention including a circuit for providing power to a portion of a gyro system. This circuit includes power supply terminals 1 which are connected to a power supply, not shown. Power is coupled through the terminals 1 and through line relay switches 2 which are controlled by a line relay 3 and to a gyro motor 4 having armature windings 5 and a neutral connection 6. The line relay 3 is connected through diodes 3' to the terminals 1 so that the switches 2 are closed when power is applied to the terminals 1. However, when the power supplied to the terminals 1 is interrupted, the line relay 3 is deactivated and the switches 2 are open. Thus, where, after an interruption in the power supplied to the terminals 1, the armature of the motor 4 continues to rotate so that the motor 4 acts as a generator, as described below, the line relay 3 and the switches 2 remove unnecessary loads from the motor 4.

The armature of the motor 4 is mechanically coupled to a gyro rotor 7 so as to drive the rotor 7 as long as power is supplied to the armature windings 5 through the switches 2 and the terminals 1. However, when an interruption occurs in the power supplied to the gyro system, the motor is no longer energized, and thus it cannot drive the rotor 7. The gyro rotor 7 has momentum built up about its axis of rotation from when it was driven by the motor 4, and the gyro rotor 7 is mounted so as to have as little frictional resistance to its rotation as possible. Therefore, the gyro rotor 7 continues to rotate for a long time after a power interruption. Since the gyro rotor 7 is mechanically coupled to the armature of the motor 4, the rotor 7 rotates the armature of the motor 4 as well so that the motor 4 acts as an electrical energy generator having its generated energy level proportional to the angular momentum of the gyro rotor.

In the gyro system, means are also included for coupling to a cycle changing means 8 energy generated by the motor 4 as it is rotated by the gyro rotor 7 after a power interruption. In the illustrated embodiment, these means comprise rectifiers 9 which couple the energy from the armature windings 5 to the cycle changing means 8. The rectifiers 9 further couple energy from the power supply through the terminals 1 and the switches 2 to activate the cycle changing means 8 prior to the power interruption.

The erection cycle changing means 8 comprises a control means 10 mechanically coupled to a controlled apparatus 11 and having a first energization state for effecting a first erection of the gyro system and a second energization state for effecting a second erection of the gyro system. Where the control means 10 comprises a relay, as shown in the illustrated embodiment, the relay may be in its first energization state when an insufficient current is coupled through the rectifiers 9 whereby the relay causes the controlled apparatus 11 to maintain a first type of erection mode of the gyro system. The energy coupled through the rectifiers 9 may be sufficient to sustain the relay 10 in its second type of energization state whereby it causes the controlled apparatus 11 to maintain the second erection mode of the gyro. Thus, the controlled apparatus 11 might alternately cause a first and a second type of erection mode of the gyro, such as a direct or precession erection mode of the gyro.

The cycle changing means 8 further includes an energy level responsive means 12 which is responsive to the energy coupled to the cycle changing means 8 by the coupling means or rectifiers 9. Where, as in the illustrated embodiment, the energy level responsive means 12 comprises a semiconductor switching device such as an SCR, the switching device or SCR has a gate electrode 13. Energy is coupled through the rectifiers 9 and the relay 10 to the anode of the rectifier 12. The cathode of the rectifier 12 is connected to ground. When a firing pulse is coupled from a timing circuit 14 to the gate electrode 13 of the SCR 12 and power is supplied through the terminals 1 and the switches 2 and the rectifiers 9 to the cycle changing means 8, the SCR 12 begins to conduct current. Any time thereafter, a sufficient current may flow through the relay 10 to change its energization state and effect a change in the erection cycle of the gyro system. The SCR 12 continues to conduct as long as the current coupled through the rectifiers 9 and the relay 10 is above the minimum holding current level of the SCR 12 so as to sustain a necessary voltage drop across the SCR 12.

The timing circuit 14 is provided to time the duration of the first type of erection mode, which occurs when power is first supplied to the gyro system or any time when the SCR 12 is not conducting. At this time the relay 10 is in its first energization state which causes the controlled apparatus 11 to maintain the first type of erection mode. When power is supplied to the gyro system, the timing circuit 14 is energized through a terminal 15, and it provides a firing pulse to the gate electrode 13 of the SCR 12 a predetermined time thereafter so that current may flow from the rectifiers 9 and through the relay 10 to effect a change in the erection cycle of the gyro system. The timing circuit 5 may comprise a relaxation oscillator, such as the well-known unijunction transistor oscillators of the type shown in the United States Patent 2,968,770, Sylvan, issued on Jan. 17, 1961.

During the normal operation of the gyro system, power is applied to the power supply terminals 1 and through the switches 2 to the armature windings 5 of the motor 4. The motor 4 drives the gyro rotor 7. At the same time, electrical energy is applied to the timing circuit 14 through the terminal 15 and ground. The SCR 12 is not conducting, and thus the relay 10 is in its first energization state. The controlled apparatus 11 maintains the gyro system in its first type of erection mode. After a predetermined time during which the motor 4 has driven the gyro rotor 7 to a rotor speed such that the gyro rotor 7 has developed a substantial momentum about its axis of rotation, the gyro is ready for the second type of erection mode. The timing circuit then provides a firing pulse to the gate electrode 13. This fires the SCR 12, and current may flow from the rectifiers 9 to the relay 10 and the SCR 12 to energize the relay 10 to its second energization state whereby it effects the second type of erection mode through the controlled apparatus 11.

Upon an interruption in the power supplied to the gyro system at the terminals 1, the motor 4 no longer drives the gyro rotor 7. However, the gyro rotor 7 now rotates the armature of the motor 4 so that the motor 4 functions as an energy generator. At this time the line relay 3 is de-energized so that the switches 2 are opened to preclude the loading down of the motor 4 as it acts as a generator. Immediatly after the power interruption, current is coupled from the armature windings 5 and through the rectifiers 9 to the relay 10 and the SCR 12. The current generated by the motor 4 is not sufficient to maintain the relay 10 in its second energization state. The relay 10 changes back to its first energization state, and the controlled apparatus 11 is in a position so that it can now maintain the first type of erection cycle for the gyro. However, since the power to the gyro system has been interrupted, there is no erection of the gyro. The current flow through the SCR 12 is greater than the holding current level of the SCR 12 so that it maintains the small voltage drop across the SCR 12 which remains conducting. The SCR 12 continues to conduct after the power interruption until the gyro rotor 7 slows down to a speed such that the energy generated by the rotating armature of the motor 4 is insufficient to keep the SCR 12 conducting. Experimentally, the energy generated in this manner has kept an SCR conducting as long as five minutes.

If power is reapplied to the gyro system, and thus to the terminals 1, while the SCR is still conducting, the line relay 3 closes the switches 2 so that an increased current flows through the rectifiers 9 to the relay 10. The relay 10 is immediately returned to its second energization state. Therefore, the control apparatus 11 maintains the gyro system in its second type of erection smode without the system's going through the first type of erection cycle as it had when power was first applied to the terminals 1.

However, if after an interruption in the power applied to the gyro system, the angular momentum, and thus the speed of the gyro rotor, decreases so that it drives the armature of the motor 4 very slowly, the energy generated by the motor 4 and coupled to the SCR 12 is not sufficient to sustain the conduction of the SCR 12. When power is reapplied to the gyro system after the SCR 12 has stopped conducting, the SCR 12 blocks the flow of current from the rectifiers 9 as it had when power was first applied to the gyro system. Therefore, the relay 9 remains in its first energization state, and the controlled apparatus 11 maintains the gyro system in its first type of erection mode until the timing circuit 14 fires the SCR 12 once again. Therefore, the gyro system goes through the first type of erection mode upon the reapplication of the power to the terminals 1.

Our invention is not limited to the particular details of the embodiment illustrated, and we contemplate that various modifications and applications will occur to those skilled in the art. It is therefore our intention that the appended claims cover such modifications and application as do not depart from the direct spirit and scope of our invention.

What we claim as new and desire to secure by Letters Patent of the United States is:

1. In a gyro system having a first and a second type of erection mode, means for changing the erection cycle of said gyro after an interrupton in the power supplied to the gyro system, and an electric motor for rotating a gyro rotor, the improvement comprising:
   (a) the cycle changing means including control means having a first energization state for effecting the first erection mode and a second energization state for effecting the second erection mode,
   (b) the cycle changing means also including energy level responsive means,
   (c) means for coupling energy generated by the motor as it is rotated by the gyro rotor after the power interruption to the cycle changing means, and
   (d) means for coupling said energy level responsive means to said control means so that said control means is in the second energization state upon reapplication of power to the gyro system as long as the portion of the generated energy coupled to said energy level responsive means remains above a predetermined energy level.

2. A gyro system according to claim 1 wherein said energy level responsive means comprises a semiconductor switching device which, after it begins conducting, remains conducting until the current flow therethrough is below its minimum holding current level.

3. A gyro system according to claim 1 wherein said electrical energy coupling means comprise a plurality of diodes which are connected between the armature of the electric motor and the erection cycle changing means.

4. A gyro system according to claim 1 wherein said energy level responsive means and said control means are connected in series.

5. A gyro system according to claim 1 wherein switching means are provided for disconnecting the motor from a gyro system power supply after an interruption in the power.

6. In a gyro system having a first and second type of erection mode, means for changing the erection cycle of the gyro after an interruption in the power supplied to the gyro system, and an electric motor for rotating a gyro rotor, the improvement comprising:
   (a) the cycle changing means including an electrical relay having a first energization state for effecting the first type of erection mode and a second energization state for effecting the second type of erection mode,
   (b) the cycle changing means also including a semiconductor switching means which, after it begins conducting, remains conducting until the current flow therethrough is below its minimum holding current level,
   (c) a plurality of diodes interconnecting the armature of the electric motor and the cycle changing means so as to couple to the cycle changing means electrical energy generated by the motor as it is rotated by the gyro rotor after the power interruption, and
   (d) means for connecting said semiconductor switching means to said electrical relay so that said relay is in the second energization state upon reapplication of power to the gyro system as long as the current flow through said semiconductor switching means remains above the minimum holding current level.

7. A gyro system according to claim 6 wherein said semiconductor switching means comprises a silicon controlled rectifier and said silicon controlled rectifier and said electrical relay are connected in series.

8. A gyro system according to claim 6 wherein switching means are provided for disconnecting the motor from a gyro system power supply after an interruption in the power.

No references cited.

MILTON KAUFMAN, *Primary Examiner.*

C. J. HUSAR, *Assistant Examiner.*